Feb. 14, 1967    D. F. POBST, JR., ET AL    3,304,355
PROCESS FOR FORMING AGGREGATES OF POWDERED MATERIALS
Filed June 6, 1963    4 Sheets-Sheet 3

INVENTORS
DAVID F. POBST, JR.
BOBBY J. ROWLETT
BY
ATTORNEYS

INVENTORS
DAVID F. POBST, JR.
BOBBY J. ROWLETT
BY
ATTORNEYS

United States Patent Office 3,304,355
Patented Feb. 14, 1967

3,304,355
PROCESS FOR FORMING AGGREGATES OF
POWDERED MATERIALS
David F. Pobst, Jr., and Bobby J. Rowlett, Franklin, La.,
assignors to Columbian Carbon Company, New York,
N.Y., a corporation of Delaware
Filed June 6, 1963, Ser. No. 286,042
3 Claims. (Cl. 264—117)

This invention relates to the aggregating or pelleting of powdered materials and, more particularly, relates to aggregating or pelleting processes of the type in which the powdered material is formed into discrete, pasty aggregates by vigorous agitation with a wetting liquid, e.g., water, which aggregates may thereafter be dried, if desired, to form a dustless, free-flowing, pelleted material. The invention provides improvements in method and apparatus whereby the physical characteristics of the aggregates or dried aggregates may be nicely regulated and carefully controlled.

The invention is especially useful as applied to the pelleting of carbon black and will be more fully described and illustrated herein with particular reference to that application. It will be understood, however, that the invention is not so restricted but is applicable to the aggregating or pelleting of other powdered materials.

In order to effectively utilize some solid materials in a preferred manner, it is necessary that they be produced as a powder or be converted to powdered form by subdivision, e.g., by grinding or pulverizing. Quite frequently, however, it is desired to convert the material, prior to its intended use, from the powdered state to a pelleted form in order to enhance its handling properties. Carbon black, for instance, is produced as a light flocculent powder and it has been customary to reduce the powder to beads or pellets prior to shipping, storing or use. The advantages of converting such powdered materials to pelleted form are well known to the industry and need not here be further recited.

One well-known method for reducing powdered material to aggregate or pelleted form involves the step of vigorously agitating the powdered material, carbon black, for instance, with a wetting liquid, e.g., water, and, as previously noted, the present invention is directed to improvements in that type of operation.

Such pelleting operations are affected by many variables which complicate regultaion and control of the physical characteristics of the finished product. If too fragile, the pellets may be damaged by excessive handling and may be reduced, at least in part, back to the powdered state. If, on the other hand, the particles comprising the pellets are too tightly bound together, their redispersion may be overly difficult.

In the pelleting of carbon black, for instance, the wetting liquid used may be water, as such, or an aqueous solution or emulsion of a binding or agglutinating agent, e.g., sugar, a resin or a protein glue, and the resultant pellets are usually dried prior to shipment or storage.

The agitation of the powdered material with the wetting agent is, with advantage, effected by known procedure involving the passing of the powdered material and wetting agent, in controlled proportions, through a horizontally elongated chamber or conduit in which there is rotatably mounted a coaxially-positioned shaft to which there are affixed a multiplicity of spaced radially-extending elements, e.g., rods. Upon rotation of the shaft, the material passing longitudinally through the chamber is subjected to impact and agitation by the rapidly rotating, radially projecting, spaced members which cause the particles, while in a continuous mass, to tumble and roll by reason of the action of the agitating members and to slide off the surfaces of the agitataing members, as well understood in the art.

By controlling both the nature of the agitation and the extent to which the particles are wetted, discrete pasty aggregates may be formed having a high order of roundness. After formation, the aggregates may be dried to remove the bulk of the wetting liquid and produce firm pellets. High quality carbon black pellets are characterized by an apparent bulk density which is higher than that of the parent powder, are more freely flowing, and are substantially free of fines or dusts. They are further characterized by a high packing point and optimum crushing strength, these being necessary to prevent compaction or destruction in handling, without the powder particles being so tightly bound together as to make their redisperison overly difficult.

In aggregating and pelleting carbon blacks, after the manner described, formation of the aggregates is influenced by several critical variables which affect important physical characteristics of the aggregates and, consequently, those of the finished pelleted product. The correct proportion of wetting liquid must be employed before the discrete aggregates will form. An excessive or insufficient quantity of the liquid will result in "mudding out" and "dusting out," respectively. Also, a correct amount of work must be performed on the mass in agitating the mass of particles to optimize formation of the aggregates.

The term "work input" or "work input value" as used herein, denotes the work involved in moving the spaced agitating members through the mass of wetted particles, i.e., energy transferred from the agitating members to the partly unyielding mass as the said members move through it. The term "critical work input level" as used herein is intended to mean a work input value which must exist to optimize formation of aggregates having a specific combination of physical characteristics. Excessive work input is destructive of aggregates already formed, while insufficient work input will not thoroughly aggregate the wetted powder. A critical work input level may, therefore, be an optimization of constructive and destructive values to permit the formation of aggregates having a maximum degree of roundness and uniformity of size, while minimizing the amount of dust or fines which remain after agitation.

Prior to this invention, various methods were utilized for establishing a work input employed in agitating the wetted powder by varying the resistance to movement of the agitating members. None, however, has provided means for precisely maintaining the work input value during fluctuation of, or after altering, variables such as the flow rate of the wetted powder through the zone of agitation; the consistency of the wetted particles, e.g., degree of stiffness or pastiness; or the pattern of flow of the wetted powder through the zone of agitation.

Previously, work input values have been established by means of a stationary weir or orifice, positioned near the outlet of the agitating zone, for retaining a fixed volume of the wetted powder particles within the zone of agitation. The resistance offered to the agitating members by the retained mass could not, therefore, be altered at will during operation; nor could fluctuations in the previously mentioned variables be readily compensated for, although fluctuations commonly occurred during the aggregating operation. If the variables were intentionally changed to any significant extent, the necessary work input level had to be re-established by manually substituting another size stationary weir or orifice, which usually required shutting down the aggregating operation. Adjustment and regulation of the work input value by manual means was for the most part unsatisfactory, and difficult, and provided only incremental changes which were usually inadequate for optimizing the formation of the aggregates. The difficulties heretofore experienced are avoided by our present invention whereby we establish a critical work input level, i.e., optimal for producing a pelleted material having the desired properties, and, once established, maintain this optimal work input level, without interruption of the operation, and in spite of changes and fluctuations in other operating conditions, all as hereinafter as more fully described and illustrated.

The invention will be further described and illustrated with reference to the accompanying drawings, which represent specific embodiments thereof, but it will be understood that the invention is not limited thereto, since other embodiments of the invention will be apparent from this description.

FIGURE 1 of the drawings is a somewhat diagrammatic flowsheet illustrating how the invention may, with advantage, be applied to a process for making dried pellets of powdered materials.

Figure 1:
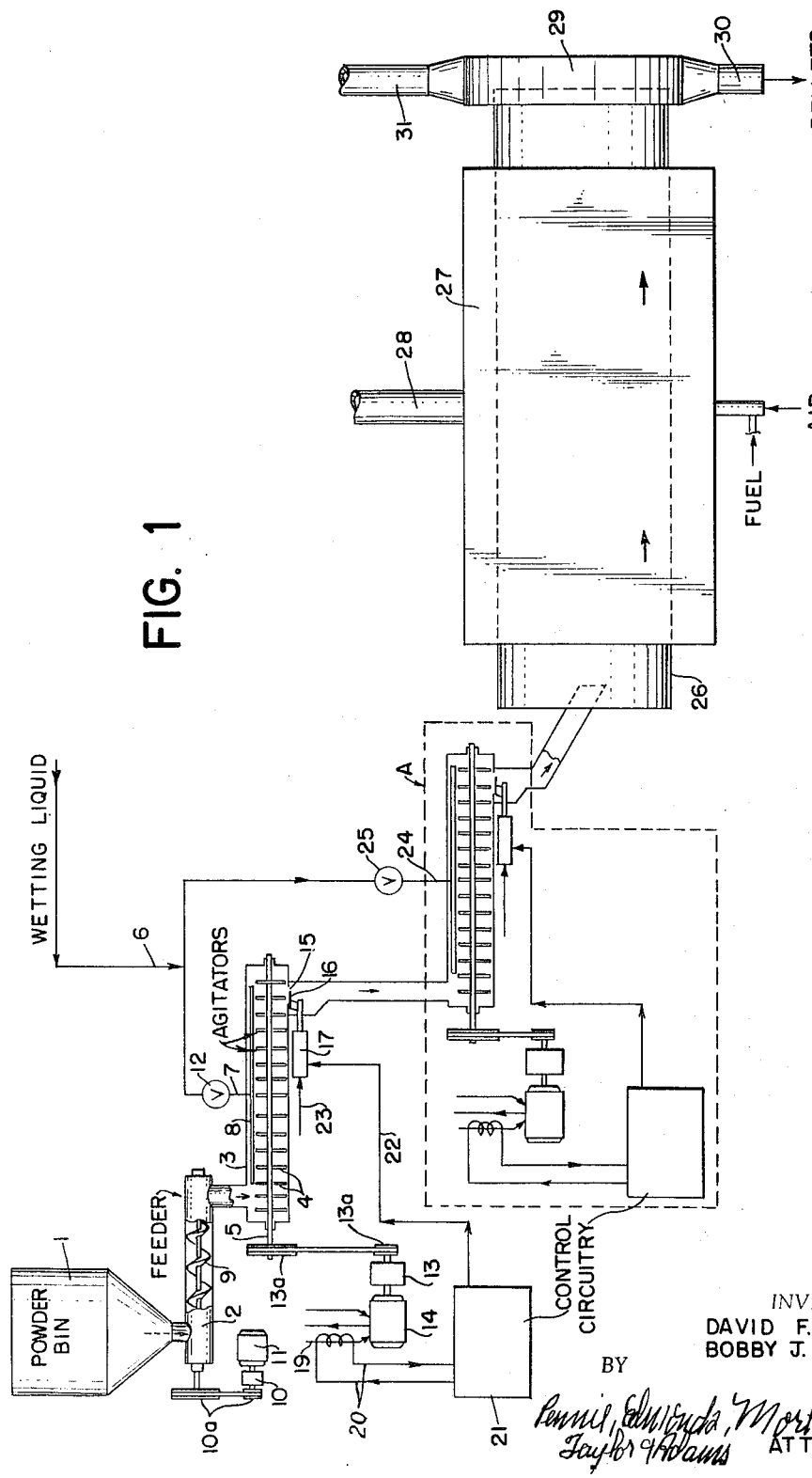

Referring to FIGURE 1, the powered material is fed from the powder bin 1 at a predetermined and relatively constant rate by a helicoid conveyor 2 and passed into an enclosed conduit 3. A series of spaced agitating members 4 are radially affixed to a rotatable shaft 5 mounted axially within the conduit 3. A wetting liquid, supplied under pressure through line 6, is fed into the conduit 3 through line 7 and a distributor 8 at a predetermined and relatively constant rate. The rates at which the powder and the wetting liquid are fed to conduit 3 are variable and may be regulated at will. The powder feed rate may be varied by adjusting the rotational speed of the helix 9 by means of a variable speed drive unit 10 and pulleys 10a motivated by an electric motor 11. The rate at which the wetting liquid is fed into conduit 3 may be varied by means of valve 12.

Within the conduit 3, the shaft 5 is rotated by torque supplied from a speed reducer 13 and pulleys 13a motivated by an electric motor 14. Upon rotating the shaft, the affixed agitating members 4 move transversely through the mass consisting of the powder particles and the wetting liquid. The mass advances axially through the conduit 3 and discharges from an opening 15.

As the mass advances through conduit 3, it is subjected to a multiplicity of impacts by the moving agitating members 4, and the mass, of course, affords a certain resistance to the movement of members 4 therethrough. The value of the resistance, i.e., drag, depends, among other things, upon the consistency and the volume of the mass and mainly dictates the amount of work which must be employed in moving the agitating members through it and, consequently, the work input in forming the aggregates.

In the agitating devices illustrated herein, the wetted particles are caused to stick together in the form of discrete macroscopic aggregates by a rolling or tumbling action imparted to the particles within the mass by the motion of the agitating members, as previously explained. Also, as previously described, the work input during formation of the aggregates strongly influences the physical characteristics of the aggregates, and finished pellets produced therefrom.

According to the present invention the work input is adjusted and regulated by varying the resistance offered to the movement of the agitating members by the wetted powder mass which may be nicely accomplished by varying the rate at which the mass is discharged from the conduit 3. Not only may the work input level be adjusted and regulated in this way, but the critical work input level may be established and maintained, i.e., a work input critical to the formation of aggregates having an exceptionally high order or roundness and uniformity of size.

Using the apparatus represented by FIGURE 1, the work input value may be established and regulated by means of a positionable obstructing member, such as damper 16, positioned automatically with respect to the opening 15 by means of a positioner 17 which responds to an actuating electric signal current generated by a transformer 18 coupled with a power lead 19 supplying current to the motor 14. By this arrangement, the position of the damper 16 may be automatically adjusted and regulated by small increments, so as nicely to control the rate at which the flowing contents of conduit 3 discharge through the opening 15, thereby establishing and maintaining a critical work input level by continuously controlling the extent to which the conduit is filled with the wetted powder particles, the charge rate to the conduit usually being maintained constant.

The power requirement of the motor 14 varies directly with the resistance offered to the moving of the agitating members by the contents of the conduit 3. As the power requirement of the motor varies, so also does the current load supplied to the motor through power lead 19. By feeding the transformer-generated signal through lines 20 to appropriate control circuitry 21, a variable but regulated signal may be supplied by line 22 to the positioner 17 so that the position of the damper is dependent upon the strength of the signal generated by the transformer. The positioner may, for example, be motivated by a pressurized fluid supplied through line 23, so that the position of the damper is dictated by the value of the fluid pressure which, in turn, is proportional to the value of the actuating signal supplied to the positioner by line 22.

By suitable arrangement of the control circuitry, the damper 16 may be positioned automatically to effect the greatest reduction of area of the opening 15 when the current load to the motor 14 is low and, conversely, to effect an opening of greater size when the current load is higher. Assuming a fixed consistency for the wetted powder mass within the conduit 3, it can be seen that when the volume occupied by the mass is lowest, maximum obstruction will be presented to the opening 15 by the damper 16, since the resistance to the moving of agitating members 4, and consequently the motor power requirement, is lowest. On the other hand, increasing the degree of fill within the conduit 3 increases the motor load, and the damper will be caused to open proportionately.

Advantageously, the control circuitry may also comprise means for adjusting the general location of the damper 16 so that automatic variation in area of the opening 15 may be accomplished within limits which are less than the total unobstructed area of the opening, e.g., the opening may be maintained partly closed at all times, while the damper is, nonetheless, repositioned automatically to change the cross-section area of the discharge opening. Within practical and feasible limits, therefore, any desired work input value may be established and maintained for agitating the wetted powder mass. By automatic positioning of the damper in response to a signal proportional to the motor load, the resistance offered the agitating members by the wetted powder mass may be kept at a constant value, regardless of fluctuations in flow rate of the wetted powder, and the work input value may be regulated to the critical work input level. It can be seen that the damper is, in fact, positioned automatically in response to an actuating signal which is representative of the work input value, and where the critical work input value has been established, it is automatically maintained.

When one conduit and conjunctive agitating means is not sufficient or practical for forming satisfactory aggregates, two or more units having independent control circuitry, as illustrated within the confines of dotted lines A, may be used in conjunction so that one unit discharges into another. The time period of agitation may be significantly extended by this arrangement, and the wetted powder particles may be subjected to different values of work input in each unit, thereby improving the capability of regulating the physical properties of the aggregates. If necessary, additional quantities of a wetting liquid may be added to the powder through supplemental supply lines and flow control valves as 24 and 25, respectively.

After the pasty aggregates have been satisfactorily formed, they may be dried to produce firm pellets. If the powder and the wetting liquid are thermally stable, the drying may be accomplished by heating within a rotating drum such as represented at 26. The drum may be heated by a surrounding envelope of the hot gases, contained within an enclosure 27, by burning a fuel with air at a controlled rate. Expended heating gases may be exhausted to the atmosphere through stack 28. Vaporized wetting liquid and the pellets may be fed from the drum into a collector ring 29 and separated, so that finished pellets are removed through conduit 30, while the vaporized wetting liquid is removed through a stack 31.

Figure 2:
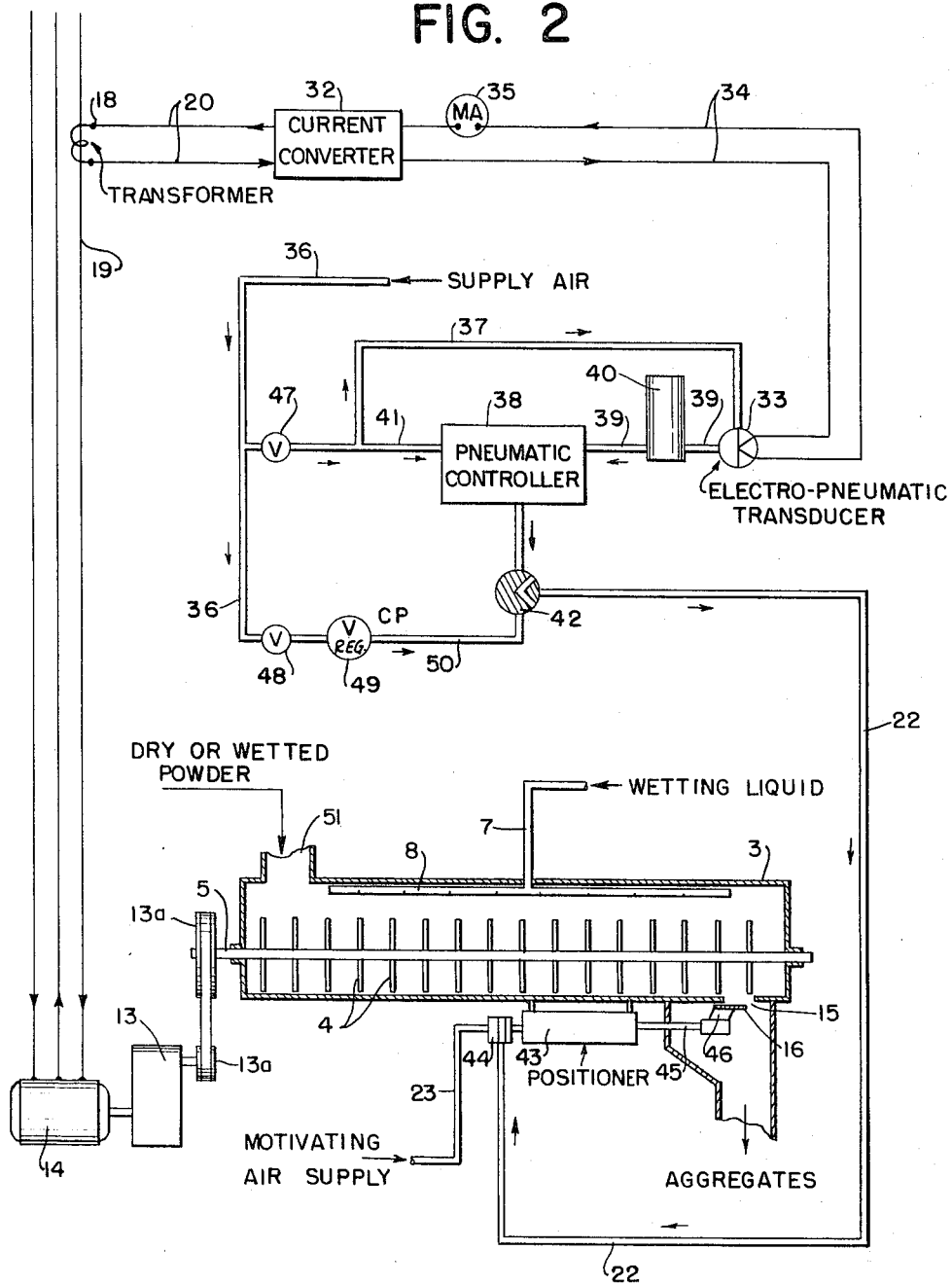
FIGURE 2 is another somewhat diagrammatic flowsheet illustrating control apparatus which may be employed in forming the aggregates.

In FIGURE 2, there is illustrated control means which may, with advantage, be employed for automatically positioning the damper used in conjunction with means previously described, like numerals indicating corresponding parts. The shaft 5, having affixed agitating members 4, is rotated by torque supplied from the speed reducer 13 through pulley arrangement 13a motivated by a three phase A.C. electric motor 14. Power supplied to the motor through lead 19 induces an alternating electric current within the transformer 18. The induction-generated A.C. is conveyed by lines 20 to a converter 32, rectified to D.C., and is conveyed thereafter to an electro-pneumatic transducer 33 by lines 34. A milliammeter 35 may be wired in series with lines 34 to permit visual monitoring of the electric current value.

The electro-pneumatic transducer may be any suitable device adapted to receive a variable electric current which it in turn converts to a proportionately variable pneumatic pressure. Air, under pressure, is supplied to the electro-pneumatic transducer through a supply line 36 and a feeder line 37. From the transducer, a pneumatic pressure is fed to a pneumatic controller 38 through line 39 having a surge tank 40 installed therein. Air, under pressure, is also supplied to the controller through line 41. From the controller, a pneumatic actuating signal pressure is transmitted through a two-way valve 42 and line 22 to the pneumatic positioner 43.

Motivating air pressure is supplied to the pneumatic positioner through line 23 and a pilot valve 44 installed therein, so that the damper positioner rod 45 is extended from the positioner upon receipt at the pilot valve 44 of an increased pneumatic actuating pressure from the controller, and is retracted by the positioner if said pressure is reduced. The degree of extension or retraction of the positioner rod is therefore proportioned to the extent of the change in pressure induced within line 22.

Since the damper 16 is affixed to the positioner rod 45 by a connector 46, and arranged to move so that the area of the opening 15 is changed upon repositioning the damper by moving the positioner rod, it can be seen that the cross-sectional area of the opening and the rate at which the contents are discharged therefrom are dependent upon the position of the damper, and are changed to a degree which is inversely proportional to the change in value of the signal current generated by the transformer 18.

A far greater motivating air pressure will usually be required to extend or retract the rod 45 than is existent within line 22. Motivating air, under sufficient pressure may be supplied to the positioner by line 23 through pilot valve 44, which supplies the air to the positioner at a pressure which is greater but directly proportional to the actuating signal pressure in line 22.

Advantageously, the pneumatic controller 38 may comprise means for varying the static pressure in line 22 within a set range (proportional control). To additional advantage, the controller may be equipped with means for varying the extent of said range (proportional band control), the response rate of the positioner to the actuating signal (rate control), and means, which may be automatic, for resetting the range in which the area of outlet 15 is maintained, thus affording compensation for any change in variables which dictate a new range (reset control).

By means of a proportional control, the critical work input level required to form the desired high quality aggregates may be approached by pre-setting the damper to maintain the area of the outlet opening 15 within a range considered suitable for providing a sufficient mass of the wetted powder within conduit 3 which affords an optimum work value so long as consistency, flow characteristics and flow rates of the wetted material do not vary significantly. By means of the proportional band and rate controls, however, moderate though significant changes in the aforementioned variables may be compensated for by an automatic, minor adjustment of the degree and rate of fill within the conduit 3; and by means of a reset control, substantial changes in flow and consistency may be compensated for by effecting a substantial change in the degree of fill within the conduit, by changing the range of open area maintained at the outlet 15. Advantageously, the latter may be accomplished, as previously described, by means responsive to variations in the electric signal produced by the transformer 18.

Should it be unnecessary or undesirable to employ the pneumatic controller 38, the damper 16 may be precisely positioned, automatically or by manual control means, while visually monitoring the milliammeter 35 to determine if the desirable or critical work input level is being maintained. To deactivate the controller, valve 47 in line 41 is closed and valve 48 is opened to supply air from line 36 to a regulating valve 49 which maintains a constant but changeable air pressure in line 50. The two-way valve 42 is repositioned to establish intercommunication between lines 50 and 22, and by manual regulation of the valve 49, the position of the damper 16 may be adjusted and then held in any desired position by the constant pressure present in line 22 after regulation of the valve is finished. Pneumatic positioners, pilot valves, and pneumatic controllers having features as previously described are well known to those skilled in the arts and need not here be further described.

In carrying out the operation, the proportion of wetting liquid required for mixture with the powder to form aggregates may be determined by simple tests within the apparatus used to effect the agitation. If too little liquid is employed, the powder particles will not be sufficiently wetted to assure complete aggregation. If, on the other hand, too much liquid is used, a sludge or slime will form instead of aggregates. When aggregating carbon black powders with water or a dilute aqueous solution or emulsion of a binder or agglutinating agent, the proportion of wetting liquid to black may range as high as 2 parts to 1, by weight, but more usually will be within the range of about 0.5 to 1.0 part per part of the black, by weight.

It will be understood, of course, that the invention is not applicable to the aggregating of powders which are not readily formed into aggregates by wetting and agitation, nor powders which it is impractical to wet.

When the agitation is effected in a conduit, such as described, having an axially mounted rotatable shaft with affixed agitating members, it is advantageous that the conduit be elongated in order that the inlet locus for the dry or wetted powder, such as opening 51, be substantially removed from the discharge locus, such as opening 15, so that the wetted powder particles are caused to advance axially from inlet to outlet over a distance which is at least several times the diameter of the conduit. The cross-sectional configuration of the conduit may be any that will permit free rotation of the shaft and affixed agitating members, but to particular advantage may be a closed circle or U-shaped. In the latter case, the conduit may be left open at the top, but more preferably is closed by a lid.

The speed at which the axially mounted shaft is rotated within the conduit is variable, but especially advantageous results may be obtained when the speed is sufficient to spiral the powder mass so that it conforms to the internal periphery of the conduit as the mass advances toward the outlet locus. When this condition is effected, more tumbling action may be imparted than when the particles comprising the mass remain near the rotating shaft. It is undesirable, however, to the rotational speeds which significantly exceed those critical to centrifugation of the mass, since excessive power may be required for turning the shaft, or work input values may be established which are impractically high.

The cross-sectional area of the conduit which contains the powder mass during aggregation should, of course, be the powder mass during aggregation should, of course, be sufficiently large to accommodate a desired throughput rate of the wetted powder particles without completely filling the conduit. Similarly, the total unobstructed area of the opening 15 should be sufficiently large to prevent "flooding" of the conduit at the desired throughput rate, for if the conduit is maintained nearly or completely filled during aggregation, little or no control flexibility is afforded for compensating for fluctuating variables which may detrimentally affect the work input level.

When prearranged in accordance with the foregoing considerations, work input values below the critical work input level may be existent at the desired throughput rate when the cross-sectional area of the discharge opening is greatest. By the automatic means, however, the damper may then be positioned to partly obstruct the discharge opening of the conduit and thus establish and maintain the critical work input value.

In determining the critical work input level necessary for any particular powder-wetting liquid combination at a desired rate of throughput, it is advantageous to monitor the power requirement for rotating the shaft and affixed agitating members. When an electric motor is employed for the purpose, a wattmeter or ammeter may be installed in the power supply circuit, or when a control circuit, as illustrated in FIGURE 2, is employed an indicating or recording ammeter may be used to determine the electric signal current generated by the transformer, since the strength of this signal is directly proportional to the power requirement of the motor. By examining the condition of the aggregates formed by the agitation, it may be determined when the critical work input level has been established.

Aggregates formed at the critical work input level are characterized by a very high order of roundness and uniformity of particle size, while those formed below the critical level are far more irregular in shape and size. Accordingly, the work input value established in forming the aggregates may be adjusted, by means as described herein, while monitoring the power requirement of the driving means for rotating the shaft 5, to determine the critical work input level required for aggregating a wetted powder at a particular consistency and throughput. Thenceforth, the critical work input level may be maintained automatically as previously described.

Figure 3:
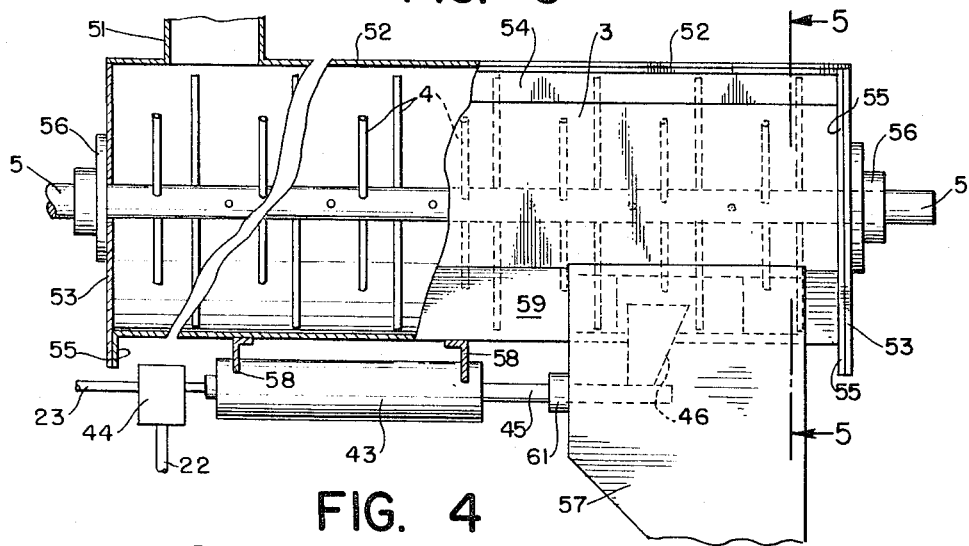
FIGURE 3 is a fragmentary vertical side view, partly in section, of an agitating device which may be employed for forming the aggregates.
Figure 4:
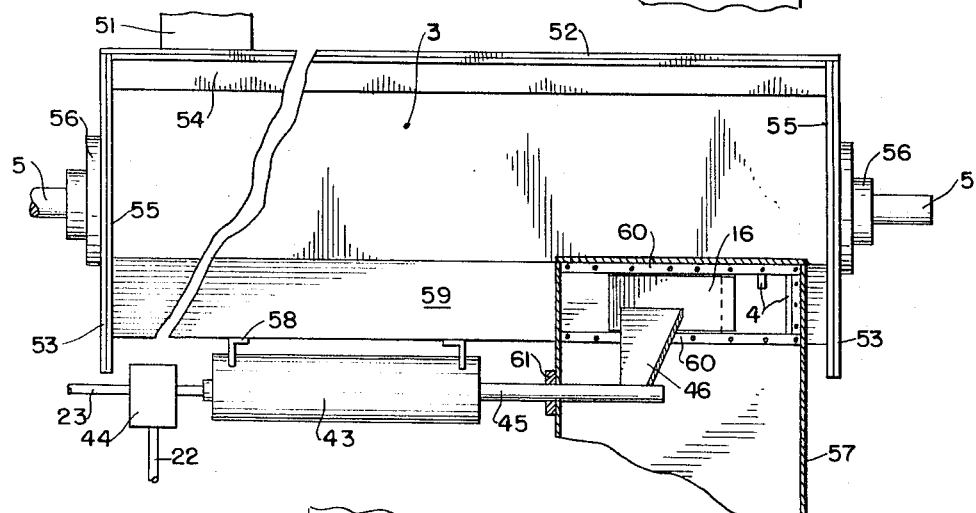
FIGURE 4 is a similar fragmentary vertical side view of the device of FIGURE 3 showing in greater detail a conjunctive damper arrangement which may be employed for adjusting and regulating the work input employed in forming the aggregates.
Figure 5:
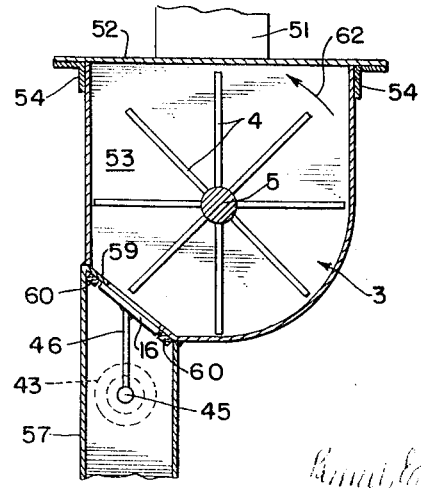
FIGURE 5 is a sectional view taken along the line 5—5 of FIGURE 3.

FIGURES 3, 4 and 5 further illustrate apparatus which may be used to advantage, in accordance with the invention, particularly when imparting a spiraling motion to the mass so that it conforms more or less to the periphery of the confining conduit while spiraling and advancing axially toward the discharge opening 15. The elongated conduit 3, having a U-shaped cross-sectional configuration, comprises a covering lid 52 and end plates 53 having corresponding mounting flanges 54 and 55, respectively, all of which may be suitably constructed of metal.

A rotatable metal shaft 5 is axially mounted within the conduit by means of bearings and seals 56 affixed to the end plates. For the agitating members, a series of closely interspaced metal rods, having a circular cross section, are affixed to the shaft in a helical pattern and extend radially therefrom. The conduit 3 is provided with a discharge opening 15. A discharge conduit 57 is affixed to the conduit 3 and arranged to receive the mass discharged through the opening 15. A damper 16, arranged to be moved transversally with respect to the opening, is attached to positioner rod 45 and is thereby moved automatically by pneumatic positioner 43 affixed to the conduit 3 by brackets 58.

The damper is maintained flush against a flattened segment 59 of the conduit wall by means of guides 60 affixed to the conduit around the opening 15. A bearing and seal 61 may serve as a guide and closure means where the positioner rod 45 etxends through the wall of the discharge conduit 57. The pneumatic positioner 43 is equipped with a motivating air supply line 23 having a pilot valve 44 installed therein. Variable pneumatic air signal pressures, lower than the motivating air pressure in line 23, are fed to the pilot valve 44, by line 22 to position the damper, by variations in the air signal pressure.

In operation, the rotatable shaft 5 is turned about its axis in the direction of the arrow 62 (FIGURE 5) at a speed which causes the powder mass to "centrifuge" within the confines of conduit 3, i.e., the mass is caused to spiral in the direction of the arrow 62 and conforms to the interior wall of the conduit 3. While swirling, the mass advances axially through the conduit toward the discharge outlet 15, and the rotational speed remains lower than that of the shaft 5, so that the agitating members 4 move transversally through the spiraling mass as it advances axially.

Location of the outlet opening 15 and assocaited damper 16 in the wall of conduit 3, as shown in FIGURES 3, 4 and 5, greatly facilitate the discharge of a spiraling, advancing mass from the conduit, since the discharge is effected in a direction tangential to the spiraling path of the mass.

Figure 6:
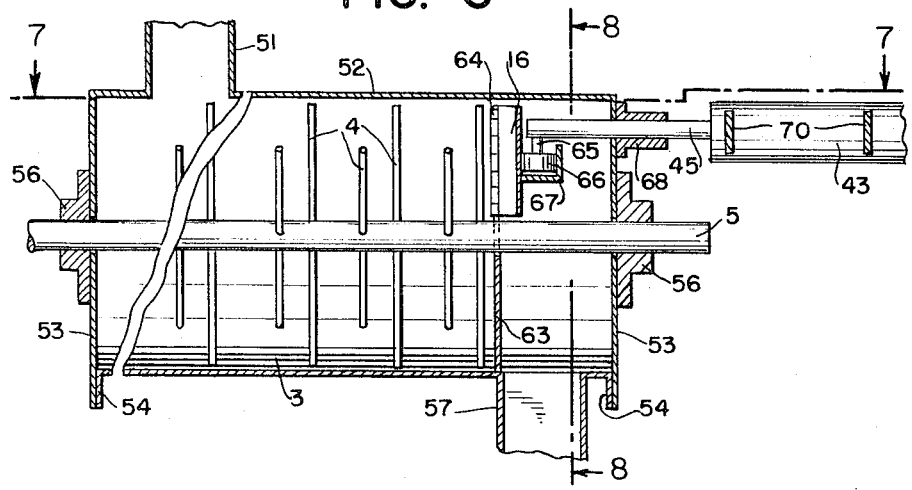
FIGURE 6 is a fragmentary, vertical sectional view of an agitating device similar to that of FIGURE 3 but employing a somewhat different conjunctive damper arrangement, which may also be employed in accordance with the invention for adjusting and regulating the work input employed in forming the aggregates.
Figure 7:
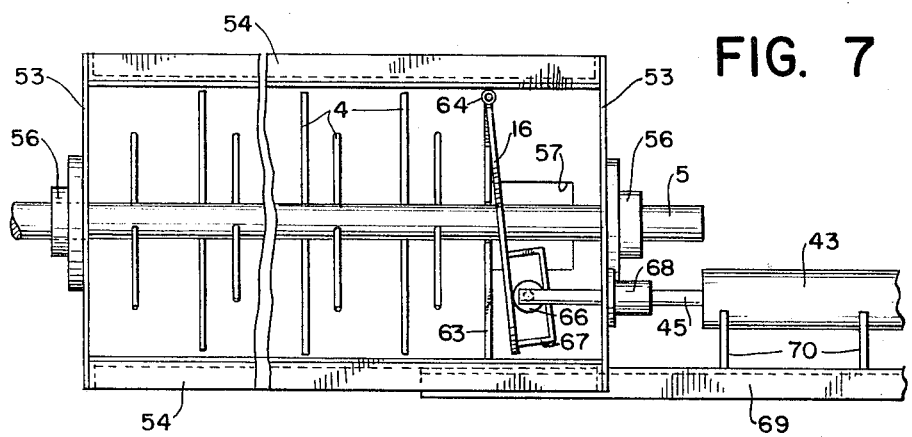
FIGURE 7 is a sectional view of FIGURE 6 along the line 7—7.
Figure 8:
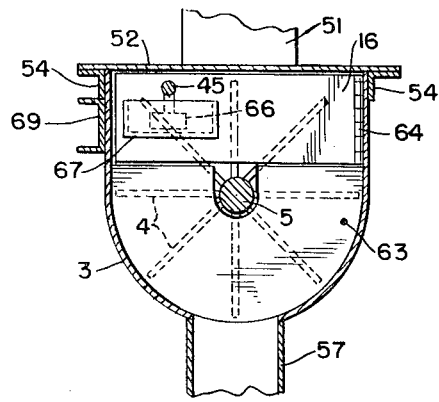
FIGURE 8 is a sectional view of FIGURE 6 along the line 8—8.

FIGURES 6, 7 and 8 represent apparatus similar to that described, but illustrate a different damper—discharge outlet arrangement. A stationary weir 63 is arranged transversely of the conduit 3 to provide a partial obstruction therein to the axially advancing powder mass. A movable damper 16 is located atop the stationary weir and is swung on a hinge 64 affixed to the wall of the conduit 3. The movable damper 16 is also arranged transversely of the conduit 3 and is sized to provide essentially complete obstruction of the conduit when aligned with the stationary weir. The movable damper is positioned with respect to stationary weir by means of the positioner rod 45 actuated by the pneumatic positioner 43. When the movable damper is disaligned with respect to the stationary weir, an outlet opening 15 is created above the weir and the cross-sectional area of this opening is directly proportional to the extent of the disalignment.

The advancing mass of wetted powder particles are discharged through the outlet opening above the weir, and passes to the intercommunicating discharge conduit 57. The rate at which the advancing mass discharges from conduit 3 is thus automatically controlled and regulated by adjustment of damper 16 responsive to the impulses passed to the positioner 43.

In connecting the positioner rod 45 to the hinge-swung damper 16 of FIGURES 6, 7 and 8, a pin 65 extending radially from the positioner rod serves as an axial mounting member for a freely revolving roller 66. The roller is coupled with the damper by means of a retaining member 67 closely fitted to the roller, but permitting the roller to move freely across the face of the damper within the confines of said retainer. This arrangement allows the positioner rod to swing the damper on the hinge while the rod extends and retracts along its axis. A seal and bearing arrangement 68 serves as a guide and closure means where the positioner rod extends through an opening in the end plate 53. The pneumatic positioner 43 may be secured by means of brackets 70 to a rigid member 69 affixed to the conduit 3.

Although the invention has been described with reference to variable area discharge openings located within the conduit which contains the agitating members, it will be understood that such discharge opening may be located elsewhere. It may, for example, be located in another, but intercommunicating, conduit such as the discharge conduit 57, for instance. Fourthermore, it is within the scope of this invention to employ means other than those disclosed for determining the value of the work input employed in moving the agitating members through the wetted powder mass.

In accordance with this invention, pellets of carbon black have been produced which exhibit an exceptionally high order of roughness and uniformity of particle size, and optimum combinations of packing point and crushing strength which prevent excessive compaction and crumbling during normal handling, while maintaining dispersibility of the particles. Such desirable physical characteristics of the pellets are attributable to the aggregation technique of the invention, i.e., the exceptional values of the characteristics are dependent upon how the aggregation is effected, and are not equated by adjustments in subsequent processing steps, such as the drying operation, for instance.

Carbon black pellets having a high order of roundness and uniformity of particle size provide distinct advantages over those which do not. It has been observed that they flow more freely and are less subject to autodetritioning during handling. Additionally, any fractionating operation necessary for size separation of the pellets is thereby greatly facilitated. This is especially advantageous for, as a general rule, pellets of carbon black are screened to separate overs and fines from a fraction having a specified size range.

The invention has the further advantage that it permits satisfactory aggregation of carbon black powder while employing lower than normal amounts of the wetting liquid. This provides the advantage of reducing the thermal energy requirement for drying the aggregates. Also, any requirement of a binder or agglutinating agent may be substantially reduced or eliminated.

It will be understood that various changes may be effected in materials, conditions, equipment arrangements, and the like, which have been described herein to illustrate the nature of the invention, without departing from its spirit or scope as expressed in the appended claims.

We claim:
1. In the process of pelleting powdered material whereby the powdered material and a wetting liquid are fed to an agitation zone having a discharge opening at one end thereof at rates which enable the production of pellets having the desired characteristics, which rates are not deliberately varied, but are subject to fluctuation during operation, and the mass of powdered pigment and wetting liquid is subjected to vigorous mechanical agitation while being advanced through said agitation zone toward the discharge opening thereof by subjecting the mass to the action of agitating means moving through the mass in a direction transverse to the advancing movement of the mass through the agitation zone, the method of regulating and controlling the characteristics of the resulting pellets which comprises varying the area of said discharge opening and thereby varying the rate at which said mass is discharged from said agitation zone, in response to and in proportion to variations in the resistance offered by said mass to the movement of said agitating means therethrough from the level of resistance required to produce pellets having the desired characteristics, whereby the area of said discharge opening is proportionately decreased when the resistance offered by said mass to the movement of said agitating means falls below the required level, and is proportionately increased when the resistance offered by said mass to the movement of said agitating means becomes greater than the required level.

2. Process as in claim 1 wherein the agitation zone is an elongated conduit and said mass is passed through said conduit as a spiraling stream conforming generally to the peripherally of said conduit.

3. The process of claim 1 in which the powdered material is carbon black and the wetting agent is an aqueous liquid.

References Cited by the Examiner

UNITED STATES PATENTS

| | | | |
|---|---|---|---|
| 1,561,903 | 11/1925 | Bowen et al. | 264—349 XR |
| 2,371,722 | 3/1945 | Wanderer | 264—349 XR |
| 2,457,962 | 1/1949 | Whaley | 264—117 XR |
| 2,605,531 | 8/1952 | McElroy | 264—349 |
| 2,800,399 | 7/1957 | King | 18—1 XR |
| 2,828,190 | 3/1958 | King | 23—313 |
| 2,829,322 | 4/1958 | Silva | 235—151 XR |
| 2,843,874 | 7/1958 | Wood | 264—117 XR |
| 2,902,644 | 9/1959 | McDonald | 235—151 XR |
| 2,942,299 | 6/1960 | Larson | 264—117 |
| 2,949,349 | 8/1960 | King | 18—1 XR |
| 2,960,721 | 11/1960 | Schnaitter et al. | 18—1 |
| 2,984,861 | 5/1961 | Cox et al. | 18—1 |
| 3,010,177 | 11/1961 | Thompson et al. | 264—117 |
| 3,017,662 | 1/1962 | Marsh | 264—117 XR |
| 3,071,803 | 1/1963 | Austin | 264—117 |
| 3,142,862 | 8/1964 | Guldman | 18—1 |
| 3,144,036 | 8/1964 | Rice | 137—14 XR |
| 3,209,771 | 10/1965 | Gogarty | 137—1 |

FOREIGN PATENTS 695,303  8/1953  Great Britain.

OTHER REFERENCES

Chemical Engineering Report, October 1951, "Agglomeration," in Chemical Engineering, vol. 58, No. 10, October 1951, pp. 168–169.

Macavei, Gh.: "Calculating the Capacity of Agglomerating Equipment," in British Chemical Engineering, vol.

(Other references on following page)

10, No. 4, April 1965, pp. 232–236 (based on article which appeared in Revista de Chemie, January 1963).

Mesarovic, Mihajlo D.: The Control of Multivariable Systems, New York, Massachusetts Institute of Technology and John Wiley & Sons, © 1960, pp. 15–17.

Nixon, Floyd E.: Principles of Automatic Controls, New York, Prentice-Hall, 1953, page 1, (Prentice-Hall Electrical Engineering Series.)

Tyson, Forrest C.: Industrial Instrumentation, Englewood Cliffs, N.J., Prentice-Hall, 1961, pp. 218–221.

Williams, Edwin T.: Stoichiometry for Chemical Engineers, New York, McGraw-Hill, 1958, chapter 4, pp. 83–91.

ALEXANDER H. BRODMERKEL, *Primary Examiner.*

A. L. LEAVITT, *Examiner.*

P. E. ANDERSON, *Assistant Examiner.*